United States Patent [19]

Rice et al.

[11] Patent Number: 5,363,317
[45] Date of Patent: Nov. 8, 1994

[54] ENGINE FAILURE MONITOR FOR A MULTI-ENGINE AIRCRAFT HAVING PARTIAL ENGINE FAILURE AND DRIVESHAFT FAILURE DETECTION

[75] Inventors: Robert W. Rice, Sandy Hook, Conn.; David H. Sweet, Tequesta, Fla.

[73] Assignee: United Technologies Corporation, Hartford, Conn.

[21] Appl. No.: 968,107

[22] Filed: Oct. 29, 1992

[51] Int. Cl.⁵ .............................................. G01B 7/00
[52] U.S. Cl. .......................... 364/551.01; 364/431.01; 364/431.02; 364/424.03; 364/508; 73/117.3
[58] Field of Search .................. 364/431.01, 431.02, 364/424.03, 508, 507, 551.01, 550, 565; 73/117.3

[56] References Cited

U.S. PATENT DOCUMENTS

| | | | |
|---|---|---|---|
| 4,500,966 | 2/1985 | Zagranski et al. | 364/432 |
| 4,811,255 | 3/1989 | Kelly, III | 364/565 |
| 4,817,046 | 3/1989 | Rice et al. | 364/551.01 |
| 5,189,620 | 2/1993 | Parsons et al. | 364/431.02 |
| 5,233,542 | 8/1993 | Höhnen et al. | 364/551.01 |

*Primary Examiner*—Jack B. Harvey
*Assistant Examiner*—Hal D. Wachsman
*Attorney, Agent, or Firm*—Michael Grillo

[57] ABSTRACT

An engine failure monitor 50 for use with a multi-engine aircraft having at least two engines detects conditions indicative of a partial (700) or total (400) engine failure, including turbine shaft failures (600). In response to an engine failure, suitable inputs (134, 138, 712) are provided to an electronic engine control for operating the remaining engine. Additionally, indications indicative of the engine failure (132, 710) are provided to the cockpit.

12 Claims, 6 Drawing Sheets

ENGINE FAILURE MONITOR FOR A MULTI-ENGINE AIRCRAFT HAVING PARTIAL ENGINE FAILURE AND DRIVESHAFT FAILURE DETECTION

TECHNICAL FIELD

The present invention relates to aircraft engine failure monitors, and more particularly to an aircraft engine failure monitor having engine driveshaft failure detection for preventing self destructive engine over speed and having detection of partial and intermittent engine failure.

BACKGROUND OF THE INVENTION

Prior art engine failure monitors typically indicate a failure in response to a selected parameter exceeding a limit, and therefore excessive delays from one-half to 5 seconds may be incurred before the detection of an engine failure. Commonly owned U.S. Pat. No. 4,817,046 to Rice et al. (Rice '046 patent) describes various subroutine logic for detecting an engine failure in a multi-engine aircraft. The Rice engine failure monitor represents a significant improvement over prior art systems because it provides reliable and nearly instantaneous detection of an engine failure.

When a failure of one of the aircraft engines is detected, a visual and/or aural warning is provided to the pilot to indicate that an engine has failed. Additionally, the gain of the power turbine speed governor is increased to provide additional required response. Finally, the electronic engine control power limits of the operating engine, e.g., engine or main gear box (MGB) torque limit, NG limit, and T5 limit, are increased to One Engine Inoperative (OEI) limits, i.e., single engine limits, to ensure that the operating engine has power available for a safe landing.

Engines often fail partially or intermittently, and settle out at some part power condition. Since the engine has not completely failed, it is often left on line either indefinitely or during trouble-shooting of the problem. A partial engine failure could be caused by foreign object damage (FOD), oil starvation, internal component failure, auxiliary or bleed air system failures, etc. These failures often result in sudden and significant power loss, and therefore the engine failure monitor described in the Rice '046 patent may treat a partial or intermittent engine failure as a total engine failure. Once the engine settles out at a reduced power level, current engine failure monitor logic terminates the engine failure warning, restores the governing gains for dual engine operation and reduces the power limits on the remaining normally operating engine(s) from the OEI limits back to dual or multi-engine operating limits.

There are a number of problems which may occur when an engine failure monitor fails to detect a partial engine failure. First, the engine governing gains are set for single engine operation when in fact both engines are on line (i.e., when a partial engine failure is indicated as a total engine failure). This situation immediately prompts a low frequency, high amplitude oscillation in the aircraft drive train because the system gain is too high. Secondly, when the engine settles out at a new lower power level, the operating limits for the normally operating engine are lowered from their emergency OEI value to their normal value, thereby reducing the total power available in this emergency situation.

It has also been found that prior art engine failure monitors may not detect an engine driveshaft failure in sufficient time to allow the engine to be shut down prior to self-destructive engine over speed.

DISCLOSURE OF THE INVENTION

Objects of the invention include provision of an aircraft engine failure monitor which quickly and reliably detects an engine output shaft failure for preventing self-destructive engine over speed and for increasing the safety margin between the time of detection and corrective action.

A further object of the present invention is to provide a reliable engine failure monitor for a multi-engine aircraft which is responsive to a partial failure of one of the engines for increasing the operating limits of the remaining engines while controlling the partially failed engine at the lower (normal) limits to prevent engine over speed or over temperature and for maintaining governing gains for all engines at their multi-engine setting to avoid introducing drive train instabilities.

According to the present invention, during operation of an aircraft engine at a power lever angle (PLA) above ground idle, turbine shaft speed (NF) is compared with main rotor speed (NR), and the rate of change in turbine shaft speed (NFDOT) is monitored, and in response to turbine speed being greater than rotor speed by a threshold value for a period which exceeds a shaft failure threshold period and in response to the turbine shaft accelerating at a rate in excess of a shaft failure acceleration threshold, the engine monitoring system indicates that a shaft failure has occurred.

In further accord with the present invention, during operation of the aircraft with aircraft controls settings at their multi-engine settings, the output torque of operating engines are compared, and if the output torque of one engine is less than a threshold percentage of the output torque of the remaining operating engines for a period which exceeds a threshold period, then a partial loss of engine power is identified.

In accordance with a first aspect of the present invention, a part power engine failure is declared in response to a partial loss of engine power, and the power limits on the normally operating engines are raised to the OEI limits, the power limits on the partially failed engine remain at their dual engine levels, and the governing gains for all remaining engines are left at the multi-engine settings.

In accordance with a second aspect of the present invention, when a partial loss of engine power is identified, the total power output of all operating engines is compared to the maximum power available from the normally operating engines during operation at their emergency OEI power limits, and if the total power output is less then the emergency power available, a part power engine failure is declared, the power limits on the normally operating engines are raised such that the total power output is equal to the emergency power available, the power limits on the partially failed engine remain at their dual engine levels, and the governing gains for all remaining engines are left at the multi-engine settings.

In still further accord with the present invention, once a partial engine failure is identified, if the torque of the partially failed engine deteriorates to zero and the engine declutches from the rotor drive system for a period which exceeds a threshold period, the partially failed engine is declared totally failed, and the governing gains for the remaining engines are set for single engine operation.

The present invention enables nearly instantaneous detection of a turbine output shaft failure, and therefore provides the ability to secure engine operation prior to a self-destructive engine over speed. By monitoring the difference between shaft rate and main rotor rate, and also the acceleration of the turbine, the present invention provides a reliable indication of shaft failure which was previously not available in the prior art. This aspect of the invention therefore provides the potential for great cost savings in the repair of an engine after a shaft failure because the potential for self-destructive engine over speeds are dramatically reduced.

The present invention also provides for recognition of a part power engine failure. A total engine failure is initially indicated in response to a partial engine failure; however, after the partially failed engine settles out at a reduced torque level, a total engine failure is no longer indicated and the pilot is warned of the partial engine failure. Governing gains remain at multi-engine settings unless a total engine failure is confirmed. If the partially failed engine deteriorates to zero torque output and de-clutches from the rotor drive system, the gain on the remaining engine is set for single engine operation.

During a partial engine failure, the power limits of the remaining operational engines are increased as necessary, depending on the power output of the partially failed engine. Therefore, the power limits on the normally operating engines are not automatically increased to their maximum OEI values, but rather only to the extent that the total power available from all engines is less than the emergency power available from the normally operating engines. For example, in a two engine aircraft if the OEI limits increase single engine torque by 35%, and an engine partially fails to 20% torque, the normally operating engine torque limit is only raised to 115%. Thereafter, if the partially failed engine performance further deteriorates, the operating limit of the normally operating engine is further increased until a maximum of 135% torque is reached, i.e., its OEI limits.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

The improved engine failure monitor of the present invention is of the type disclosed in commonly owned U.S. Pat. No. 4,817,046 to Rice et al., the disclosure of which is incorporated herein by reference. As described in the Rice '046 patent, electronic engine controls that maintain preset engine operating characteristics and/or maintain engine operation within preset limits are well-known in the art. In the context of a free turbine engine, such parameters as gas generator speed (NG), free turbine speed (NF), power turbine inter-stage temperature (T5), and engine output torque (Q) are monitored to provide safe, efficient engine control by automatically varying fuel flow (WF) to provide the desired output power to maintain rotor speed constant while the pilot varies the collective (CLP) to change the helicopter flight path. The pilot may also change the engine power output via the power lever or throttle (PLA).

The invention is described in the context of a two engine helicopter such as the Sikorsky S-76B or S-76C. The overall function of the system is to detect, both reliably and rapidly, conditions indicative of a partial or total engine failure, including turbine shaft failures, and to provide suitable inputs to an electronic engine control for operating the remaining engine. Additionally, the system of the present invention provides cockpit indications indicative of the engine failure.

Figure 1:
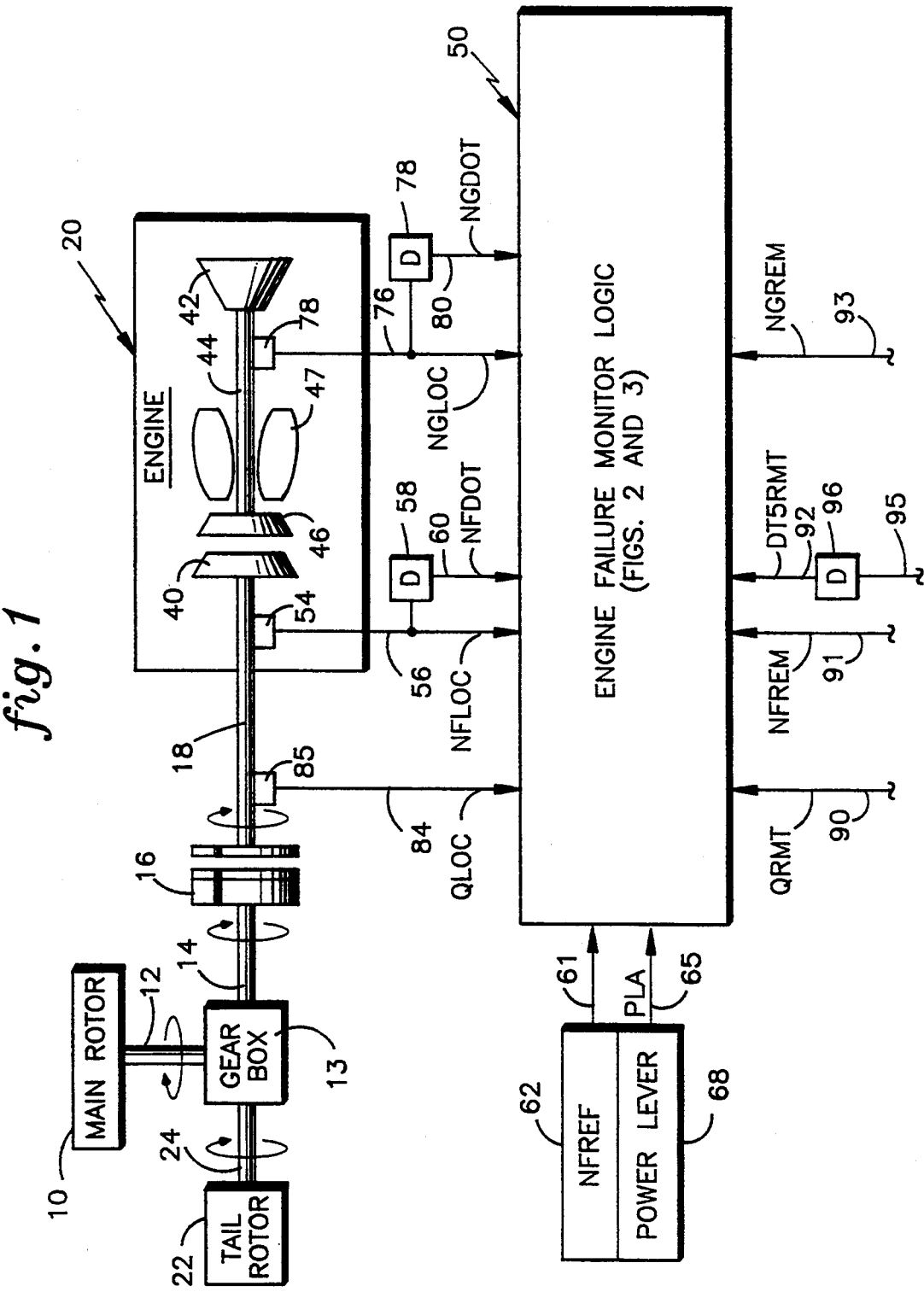
FIG. 1 is a simplified schematic diagram of a helicopter drive system having engine failure monitoring in accordance with the present invention.

Referring to FIG. 1, a main rotor 10 is connected through a shaft 12 to a gearbox 13 which is driven by a shaft 14 through an overrunning clutch 16, which engages an output driveshaft 18 of an engine 20 when the engine speed equals or exceeds the rotor speed. The gearbox 13 also drives a tail rotor 22 through a shaft 24 so that the main rotor 10 and the tail rotor 22 are always driven at speeds bearing a fixed relationship to each other, such as the tail rotor rotating about five times faster than the main rotor.

The engine 20 may typically comprise a free turbine engine in which the output shaft 18 is driven by a free turbine 40, which in turn is driven by gases from a gas generator including a turbo compressor having a compressor 42 connected by a shaft 44 to a compressor driven turbine 46, and a burner section 47 to which fuel is applied.

An engine failure monitor 50 is responsive to engine speed (NF) as determined by a tachometer 54 which measures the speed of the free turbine 40 (such as on the output shaft 18) to provide a turbine speed indicating signal on a line 56. Although the terms engine, free turbine and free turbine speed (NF) are used herein to describe the present invention, the terms power turbine and power turbine speed (NP) are also frequently used in the art, and could be used interchangeably herein when referring to the free turbine or engine. The free turbine speed (NF) is also provided on the line 56 to a differentiator function 58, the output of which is a signal indicative of the rate of change in free turbine speed (NFDOT) on a line 60.

The other inputs to the engine failure monitor 50 include a reference speed signal (NFREF) on a line 61, which typically is a reference value indicative of 100% rated speed derived from a source 62. Additionally, a power lever angle signal (PLA) is provided on a line 65, and is indicative of the angle of a pilot controlled power lever 68. A signal indicative of gas generator speed (NG) is provided on a line 76 which may be taken from a tachometer 78 responsive to the gas generator spool including the compressor 42, the shaft 44 and the turbine 46. The gas generator speed (NG) is also provided on the line 76 to a differentiator function 78, the output of which is a signal indicative of the rate of change in gas generator speed (NGDOT) on a line 80. The engine failure monitor 50 is also responsive to a torque signal on a line 84 from a standard, known torque sensor 85, which indicates the torque provided to the rotors by the engine.

The engine failure monitor of the present invention is intended for use with a multi-engine aircraft having at least two engines. Each engine is associated with a respective engine failure monitor, and constitutes a local engine. Each of the remaining engines constitute remote engines. All the signals described thus far relate to the local engine. The respective engine failure monitor 50 is also responsive to similar signals provided by the remote engines on lines 90 through 93, including torque (QRMT), free turbine speed (NFREM), the rate of change in power turbine inter-stage temperature (DT5RMT), and gas generator speed (NG), respectively. The rate of change in power turbine inter-stage temperature (DT5RMT) on the line 93 is determined by applying the remote turbine inter-stage temperature (T5RMT) on a line 95, as determined by a remote turbine inter-stage temperature sensor, to a differentiator function 96.

In the Rice '046, an engine failure monitor is described which detects and latches an engine failure when the following conditions are simultaneously met for at least 0.2 seconds:
1. Throttles in flight detent,
2. A torque split (QSPLIT) between the engines in excess of 20%,
3. A rate of decay of gas generator speed (NG) on the failed (local) engine in excess of -5% RPM/sec,
4. No loss of power (T5) on the remaining engine,
5. A drop of at least 1.0% below power turbine reference, and
6. No intentional movement of the engine throttles.

If an engine failure is detected, the following occurs:
1. Light the "Engine Out" lamp and sound aural warning to the pilot.
2. Change the following limits on the remaining engine for single engine operation, i.e., OEI limits: raise engine and main gear box (MGB) torque limit, raise engine T5 limit, raise engine NG limit.

If the engine failure conditions 1 through 6 above are met for 1.5 seconds, an engine failure is confirmed and the following occurs:
1. Double the gain of the NF governing loop to boost control response required to maintain power turbine speed on the remaining engine.

If an engine failure has been determined and latched, return to dual engine control will only occur if the following are met for at least 0.2 seconds:
1. Throttles in flight detent,
2. Gas generator rate of change of "failed" engine in excess of 0% RPM/sec,
Gas generator speed in excess of 57% RPM.

The engine failure monitor described thus far is in accordance with the skill of the art, as exemplified by the Rice '046 patent. In addition to the engine failure monitoring described hereinabove, the engine failure monitor of the present invention also provides a rapid and reliable indication of a failed engine shaft to thereby prevent self-destructive engine over speeds. In order to latch and detect an engine shaft failure, the following conditions must be met simultaneously for at least 0.1 seconds:
1. Throttles above ground idle,
2. The free turbine speed (NF) must be greater than the rotor speed (NR) by 0.5%, and
3. The acceleration of the power turbine shaft (NFDOT) must be greater than 10% per second.

The engine failure monitor of the present invention also provides reliable indication of a partial engine failure. As described hereinbefore, during a partial engine failure, the engine speed settles out at a steady state speed, and therefore the indication of an engine failure is no longer provided. However, the addition of the partial engine failure logic provides a reliable indication of the partial engine failure and takes the appropriate corrective action. In order to detect and latch a partial engine failure, the following conditions must be met simultaneously for at least 1.5 seconds:
1. Throttles in flight detent,
2. A torque split (QSPLIT) between the engines in excess of 40%.

If a partial engine failure is detected, the following occurs:
1. Light the "Partial Engine Failure" lamp and sound aural warning to the pilot.
2. Raise the following limits on the remaining engine as necessary: raise engine and MGB torque limit, raise engine T5 limit, and raise engine NG limit.

The governing loop gains remain at their dual engine settings to prevent low frequency high amplitude oscillations in the aircraft drive train which would occur if single engine gains were set when in fact both engines were on line. If the partially failed engine deteriorates to zero output torque and de-clutches from the rotor drive system, the gain on the remaining engine is set for single engine operation.

Figure 2A:
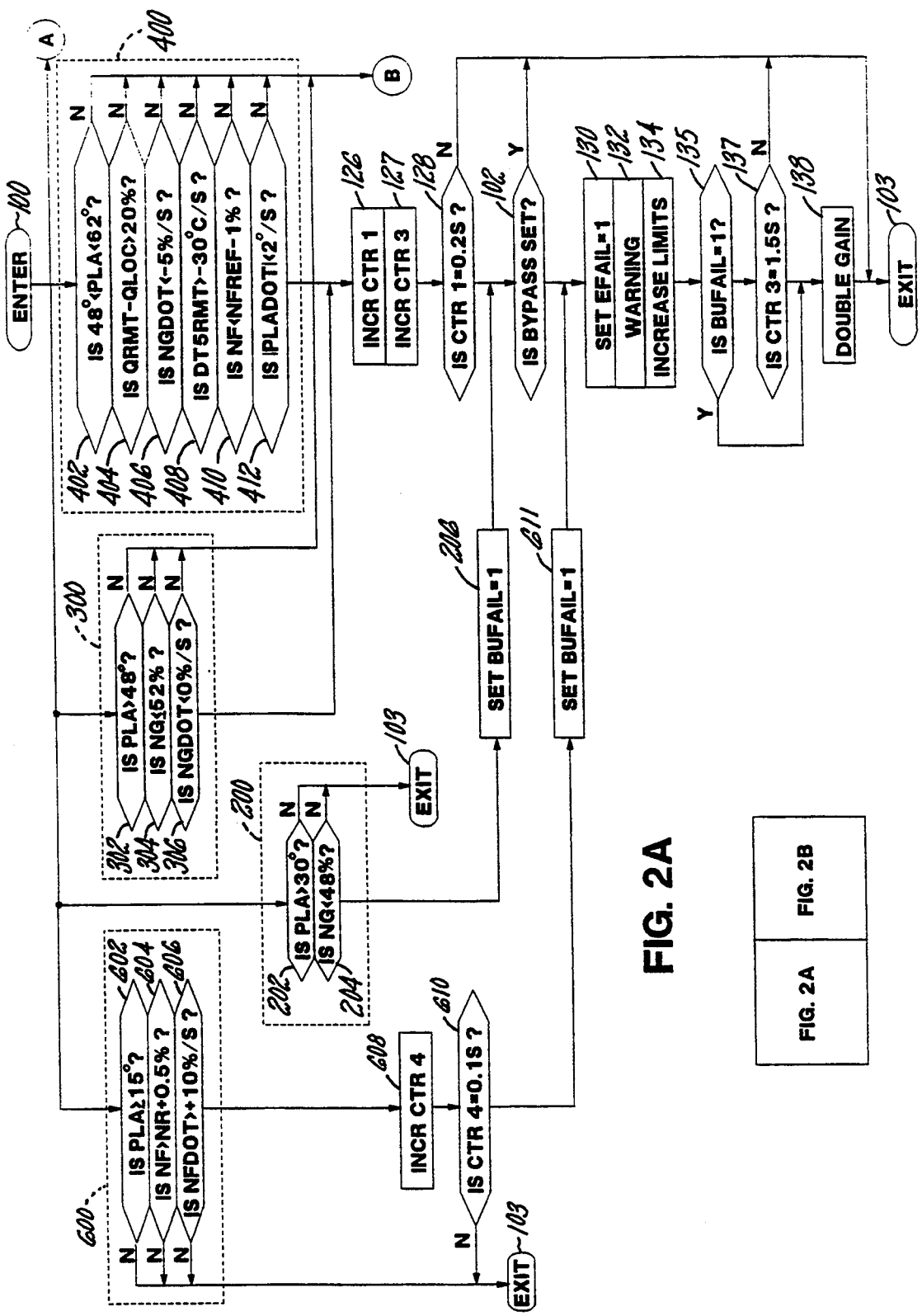
FIGS. 2A and 2B are a simplified logic flow diagram of a routine for implementing the invention in an electronic engine control.
Figure 2B:
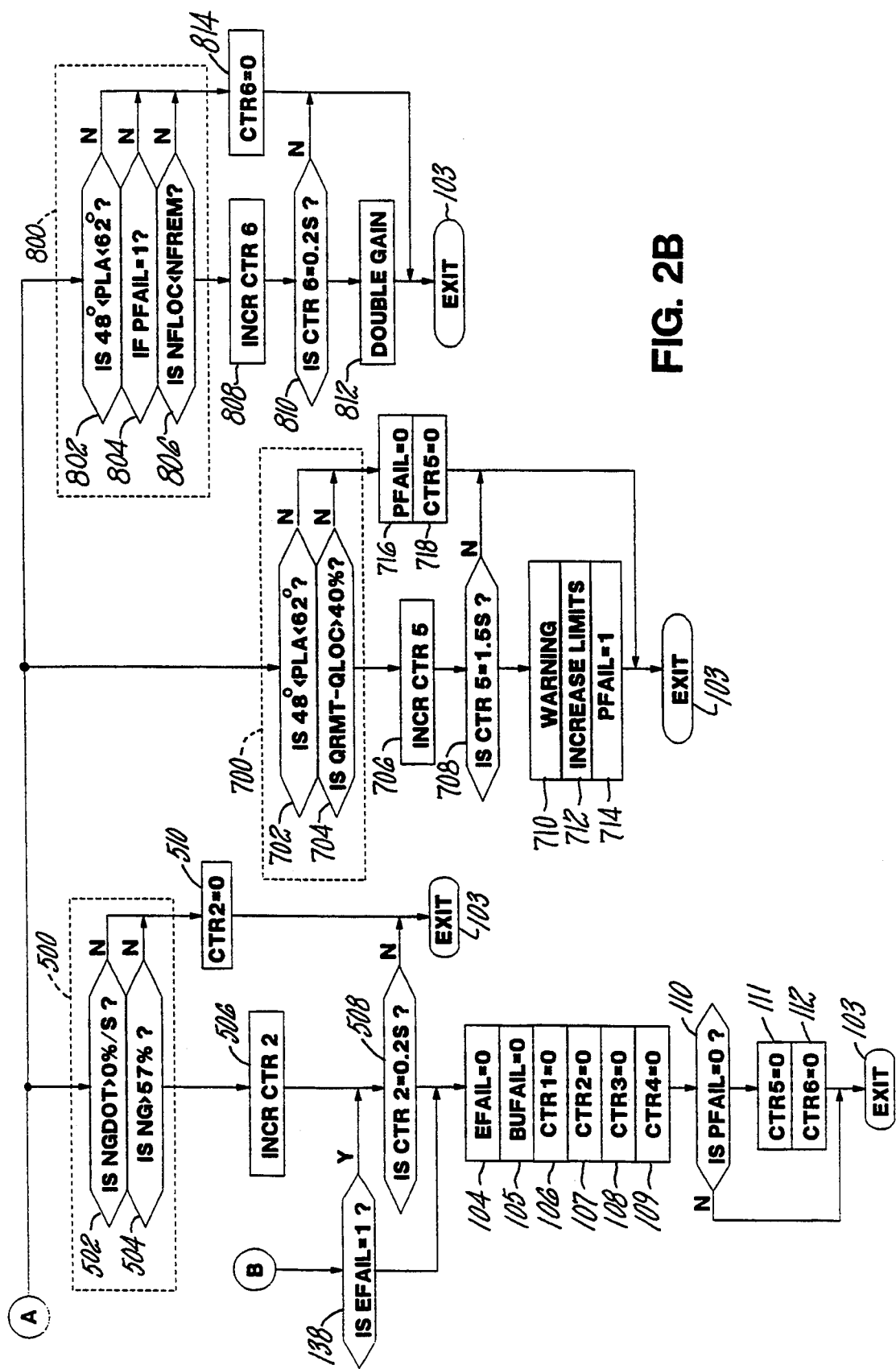

The engine failure diagnostic routine of the present invention is described in FIGS. 2A and 2B. The routine is applicable to each of the aircraft engines, and refers to a local engine and a remote engine. It will be understood by those skilled in the art that if the aircraft has more than two engines, then the routine would be applicable to each of the aircraft engines, the local engine being the engine in question, and the remote engine being the remaining engines.

Referring to FIGS. 2A and 2B, the routine is entered in a step 100. Seven subroutines 200, 300, 400, 500, 600, 700 and 800 are then simultaneously processed. The subroutine 200 is a backup to the primary logic for detecting an engine failure. This routine also provides basic engine out indication for loss of a remaining engine. In the subroutine 200, it is determined in a test 202 whether the power lever angle (PLA) for the local engine is greater than 30°, and in a test 204, it is determined whether the gas generator speed (NG) for the local engine is less than or equal to 48%. If the results of the tests 202 and 204 are positive, a BUFAIL flag is set equal to 1 in a step 206. Next, certain bypass conditions are checked in a test 102. The conditions checked in the test 102 include: Is the engine in a training mode?; Has the engine failed to manual control?; Is the engine over speed test deployed?; Is the local engine operating with the power lever angle (PLA) less then 20° (i.e., single engine operation with the local engine at ground idle)?

If any of the bypass conditions are met, the routine is exited in a step 103 and reentered at the step 100. If the bypass conditions are not satisfied, steps 130, 132, and 134 are consecutively performed. In the step 130, an EFAIL flag is set equal to 1. In the step 132, a visual and/or aural warning indicates to the pilot that the local engine has failed. In the step 134, the engine and MGB torque limit, NG limit, and T5 limit in the electronic engine control for the remote engines are increased to ensure power available in the remote engines for a safe landing.

Next, a test 135 is performed where it is determined if the BUFAIL flag is set equal to 1. The results of the test 135 are positive if the BUFAIL flag was set in the step 206, and step 138 is performed wherein the gain of the power turbine speed governing loop for the remote engine is doubled to boost the control response required to maintain the power turbine speed of the remote engine within specifications. In a three engine situation, the gain in the two remote engines would be increased by three-halves. The routine is then exited in a step 103, and reentered at the step 100. The routine is also exited and reentered at the step 100 if the results of either step 202 or 204 are negative.

The subroutine 300 improves the detection (ratio) time required for engine failures at low powers (partial power descents and autorotation where the engine is at flight idle) where other indications (QSPLIT) are not apparent. In the subroutine 300, the tests 302, 304 and 306 are consecutively performed wherein it is determined whether the power lever angle (PLA) for the local engine is greater than 48°, whether the gas generator speed (NG) for the local engine is less than or equal to 52%, and whether the rate of change in gas generator speed (NGDOT) for the local engine is negative.

If all three conditions checked in the tests 302, 304, and 306 are satisfied, a first counter (timer) is incremented in a step 126, and a third counter (timer) is increment in a step 127. Next, a test 128 is performed wherein it is determined whether the first counter has timed out to 0.2 seconds. If the results of the test 128 are positive, the bypass conditions are checked in the step 102. Thereafter the steps and tests 130 through 138 are performed. If the BUFAIL flag was not set, the results of the test 135 will be negative, and a test 137 is performed wherein it is determined whether the third time has timed out to 1.5 seconds. If the results of the test 137 are negative, the subroutine exits in the step 103. However, if the results of the test 137 are positive, the power turbine speed governing loop gains are increased as described hereinabove. In the case of a dual engine aircraft, the test 137 prevents the initiation of single engine gains until a total failure of one of the engines has been confirmed for 1.5 seconds. If the results of the test 128 are negative, the routine exits in the step 103.

If any of the test results 302-306 are negative, it is determined in a test 138 whether the EFAIL flag is 1. If the result of the test 138 are negative, steps 104 through 109 are consecutively performed wherein the EFAIL flag and the BUFAIL flag are set equal to 0, and counters 1, 2, 3 and 4 are reset to 0. Next, a test 110 is performed wherein it is determined if a PFAIL flag is set equal to 0. If the results of the test 110 are positive, steps 111 and 112 are performed wherein a fifth counter (timer) and a sixth counter (timer) are reset to 0. The subroutine then exits in the step 103. If the results of the test 110 are negative, the subroutine exits in the step 103.

If the EFAIL flag is set equal to 1 at the test 138, then it is determined in a test 508 whether a second counter (timer) has timed out to 0.2 seconds. If the results of the test 508 are positive, the routine proceeds to the steps and tests 104 through 111. If the results of the test 508 are negative, the routine exits in the step 103 and reenters in the step 100.

In the subroutine 400, it is determined whether there is a total engine failure. The subroutine 400 consists of the tests 402 through 412. In the tests 402, it is determined whether the power lever angle (PLA) is in the flight detent (between 48° and 62°). In the test 404, it is determined whether the torque split (QSPLIT) between the local engine (QLOC) and the remote engine (QRMT) is above a threshold of 20%. In the test 406, it is determined whether the rate of change in the gas generator speed (NGDOT) for the local engine is decelerating faster than a threshold of 5% per second. In the test 408, it is determined whether the rate of change of power turbine interstage temperature for the remote engine (DT5RMT) is increasing, steady, or decreasing slightly (i.e., not more than 30° C. per second). If the remote engine is also rapidly decelerating, this is indicative of dual engine deceleration, which is normal. In the test 410, it is determined whether the power turbine speed (NF) for the local engine is at least within a threshold, such as 1% of its reference speed (NFREF), as established in the electronic engine control. Finally, in the test 412, it is determined whether the absolute value of the rate of change for the power lever angle associated with the local engine is less than a threshold, such as 2° per second, which is indicative of no advertent pilot manipulation of the power lever in either direction. Advertent manipulation of the power lever could provoke indications of an engine failure.

If the results of these tests 402 through 412 are all positive, the routine proceeds to the step 126. If not, the routine proceeds to the test 138 wherein it is determined whether the EFAIL flag is 1. If it is, the routine proceeds to the test 508. If it is not, the routine proceeds to the step 104.

In the subroutine 500, it is determined whether the conditions for returning to dual engine control are satisfied. In a first test 502, it is determined whether the rate of change in gas generator speed (NGDOT) for the local engine is positive. In a test 504, it is determined whether the gas generator speed (NG) for the local engine is at least a threshold speed of 57%. If the results of the tests 502 and 504 are positive, a second counter is incremented in a step 506, and the test 508 is performed, wherein it is determined whether the second counter has timed out. If the results of either of the tests 502 or 504 are negative, the second counter is set equal to 0 in a step 510, and the subroutine is exited in the step 103.

In the subroutine 600, it is determined whether a shaft failure has occurred. The subroutine 600 consists of tests 602 through 606. In the test 602, it is determined if the power lever angle (PLA) is above ground idle, e.g., greater than or equal to 15°. In the test 604, it is determined if the turbine speed (NF) is greater than the rotor speed (NR) by a threshold value, e.g., 0.5%. The speed difference checked in the test 604 should be as small as possible without going below a value that would provide spurious indications because of electrical noise in the system. In the test 606, it is determined if the acceleration of the power turbine (NFDOT) is greater than a threshold value, e.g., 10% per second.

If all three conditions checked in the tests 602, 604 and 606 are satisfied, a fourth counter (timer) is incremented in a step 608. Next, a test 610 is performed wherein it is determined whether the fourth counter has timed out to 0.1 seconds. If the results of the test 610 are positive, a step 611 is performed wherein the BUFAIL flag is set equal to 1. Next, the EFAIL flag is set equal to 1 in the step 130. If the results of the test 610 are negative, the subroutine exits in the step 103. If any of the test results 602-606 are negative, the subroutine exits in the step 103.

In the subroutine 700, it is determined if a partial engine failure has occurred. The subroutine consists of tests 702 and 704. In the test 702, it is determined whether the power lever angle (PLA) is in the flight detent (between 48° and 62°). In the test 704, it is determined whether the torque split (QSPLIT) between the local engine (QLOC) and the remote engine (QRMT) is above a threshold of 40%. If the conditions checked in the tests 702 and 704 are satisfied, a fifth counter (timer) is incremented in a step 706. Next, a test 708 is performed wherein it is determined whether the fifth counter has timed out to 1.5 seconds. If the results of the test 708 are negative, the subroutine exits in the step 103. However, if the results of the test 708 are positive, steps 710, 712 and 714 are consecutively performed. In the step 710, a visual and/or aural warning indicates to the pilot that the local engine has partially failed. In the step 712, the engine and MGB torque limit, NG limit, and T5 limit in the electronic engine control for the remote engines are increased to ensure power available in the remote engines for a safe landing. In the step 714, a PFAIL flag is set equal to 1. If the test results of either test 702 or 704 are negative, steps 716 and 718 are performed wherein the PFAIL flag is set equal to 0 and counter 5 is reset. The subroutine then exits in the step 103.

In the subroutine 800, it is determined if a partially failed engine deteriorates to a total failed condition. The subroutine consists of tests 802, 804 and 806. In the test 802, it is determined whether the power lever angle (PLA) is in the flight detent (between 48° and 62°). In the test 804, it is determined if the PFAIL flag is set equal to one, indicating that a partial engine failure of the local engine has occurred. In the test 806, it is determined whether the turbine shaft speed of the local turbine (NFLOC) is less than the turbine shaft speed of the remote turbine (NFREM). The results of the test 806 will be positive if the partially failed local engine is de-clutched from the rotor drive system and therefore is providing no torque.

If the results of the test 802, 804 and 806 are positive, a sixth counter (timer) is incremented in a step 808. Next, a test 810 is performed wherein it is determined whether the sixth counter has timed out to 0.2 seconds. If the results of the test 810 are negative, the subroutine exits in the step 103. However, if the results of the test 810 are positive, a step 812 is performed wherein the gain of the power turbine speed governing loop for the remote engine is doubled to boost the control response required to maintain the power turbine speed of the remote engine within specifications. The subroutine then exits in the step 103. If the results of any one of the test 802, 804 or 806 are negative, a step 814 is performed wherein counter 6 is set equal to zero. The subroutine then exits in the step 103.

Figure 3A:
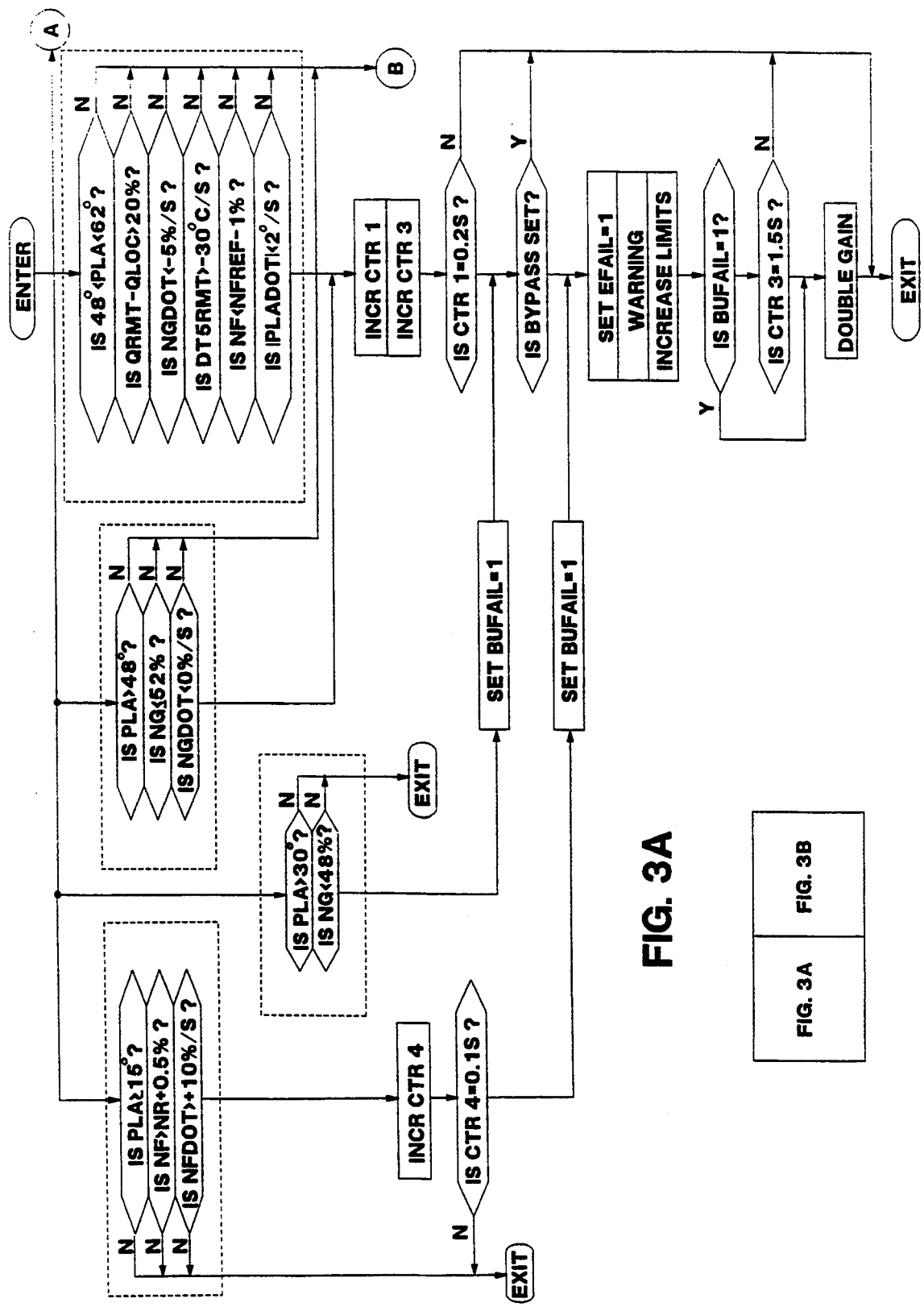
FIGS. 3A and 3B are a simplified logic flow diagram of a routine for implementing an alternative embodiment of FIGS. 2A and 2B.
Figure 3B:
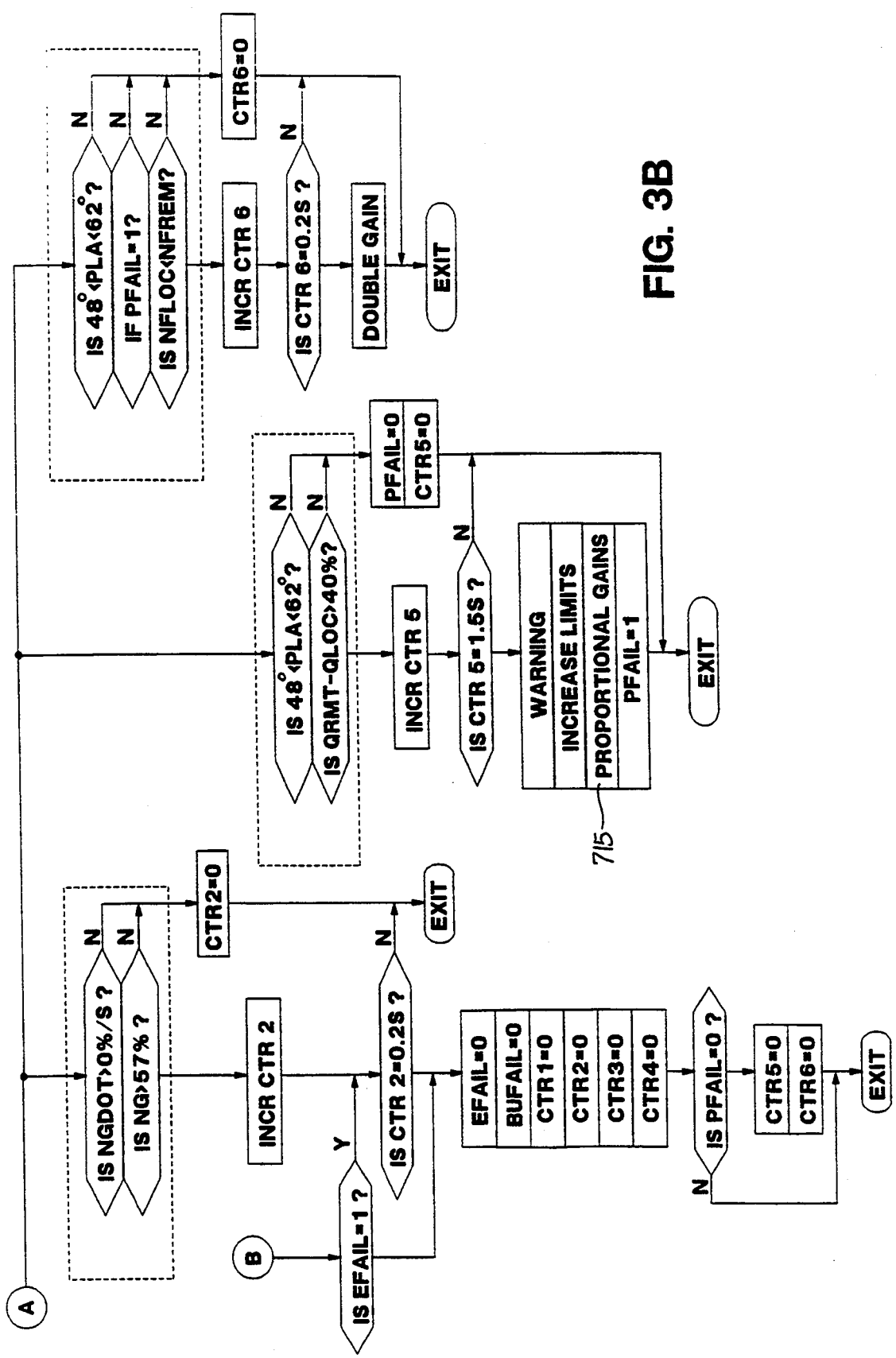

If the conditions checked in the subroutine 700 above are satisfied, then a partial engine failure is indicated. In response, the routine of FIGS. 2A and 2B does not change the gain of the power turbine governing loop for either engine. The governor gain remains at dual engine settings because both engines are still on line. However, it may be desirable to vary the gains for each operating engine in proportion to the percentage of total torque being provided by that engine. Referring to FIGS. 3A and 3B, when a partial engine failure is detected for at least 1.5 seconds, a step 715 is performed wherein the governor gains for the operating engines are adjusted based on the amount of torque provided by that engine in proportion to the total torque provided by all engines.

The invention has been described thus far as increasing the operating limits, e.g., the engine and MGB torque limit, NG limit, and T5 limit in the electronic engine control for the remote engines to their maximum values, i.e., OEI limits, in response to a partial local engine failure. Alternatively, when a partial loss of engine power is identified, the operating limits for the remote engine are only increased to the extent necessary to achieve the total power that would be available if the remote engines are operating at their maximum values. In response to a partial engine failure, the total power output of all operating engines is compared to the maximum power available from the normally operating (remote) engines during operation at their emergency OEI power limits. If the total power output is less then the emergency power available, a part power engine failure is declared, the power limits on the normally operating engines are raised such that the total power output is equal to the emergency power available, and the power limits on the partially failed engine remain at their dual engine levels.

Figure 4:
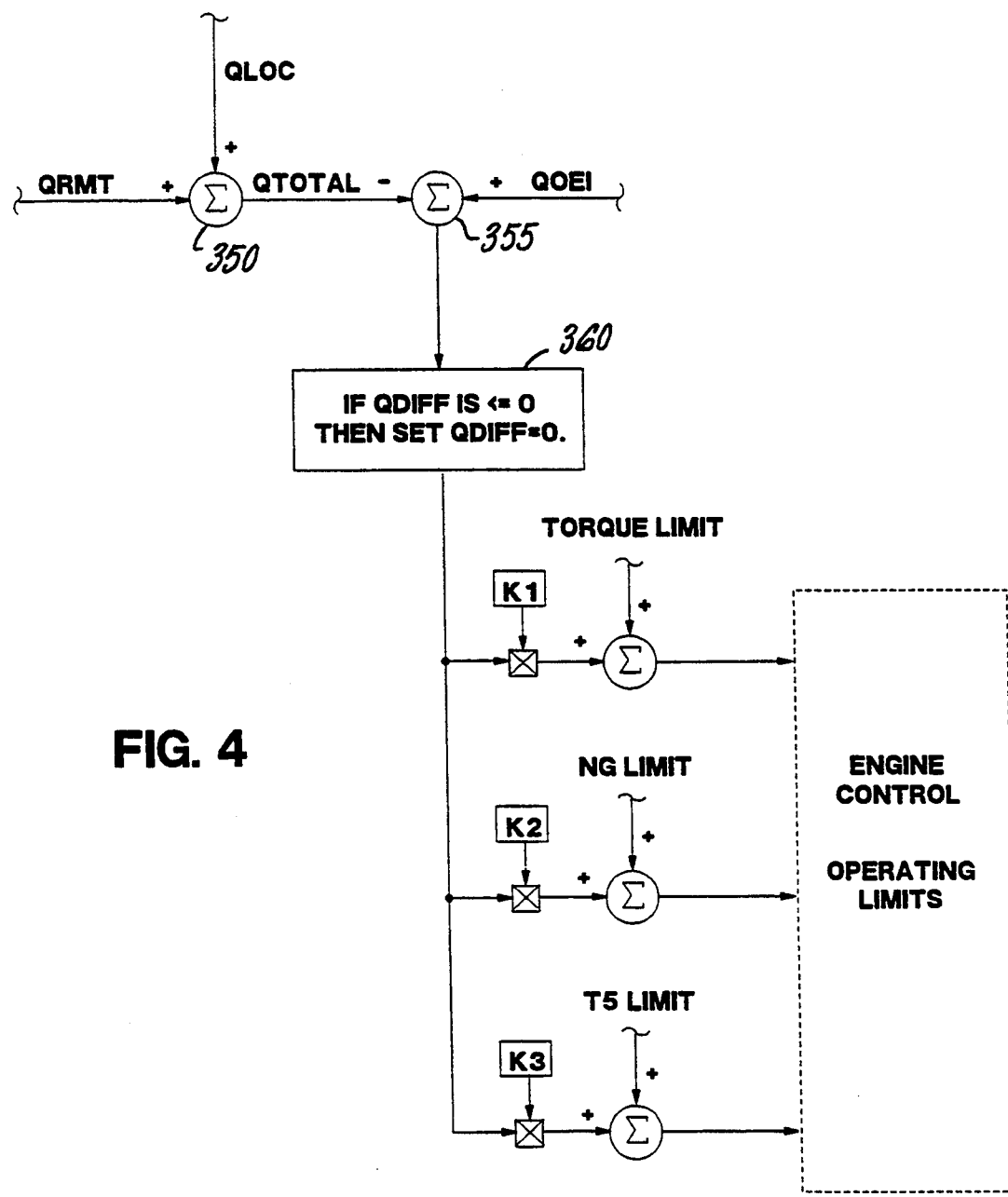
FIG. 4 is a schematic block diagram of control logic for automatic determination of power limits for a remote engine in response to a partial failure of a local engine.

FIG. 4 contains control logic for automatic determination of remote engine power limits in response to a partial failure of a local engine. The control logic of FIG. 4 is shown in the context of a two engine aircraft, i.e., a local engine and a remote engine; however, it will be understood by those skilled in the art that the logic is applicable to multi-engine aircraft having more than two engines. Referring to FIG. 4, the torque output of the local engine (QLOC) and the remote engine (QRMT) are summed at a summing junction 350, the output of which is a signal indicative of the total torque being produced by both engines (QTOTAL). A summing junction 355 compares QTOTAL to the maximum power available from the remote engine during operation at its emergency OEI power limits (QOEI). The output of the summing junction 355 is a QDIFF signal indicative of the difference between QTOTAL and QOEI.

If QDIFF is less than zero, the combined output of both engines (QTOTAL) is greater than the emergency power available (QOEI), and no change is required in the remote engine operating limits. Therefore, QDIFF is applied to a logic function 360 which sets QDIFF equal to zero if its value is less than or equal to zero. If QDIFF is greater than zero, the combined output of both engines (QTOTAL) is less than the emergency power available (QOEI), and the operating limits of the remote engine are increased by the amount necessary such that QDIFF is equal to zero, i.e., the total power available is equal to the emergency power available. QDIFF is multiplied by a conversion gain, e.g., K1, K2 or K3, and then added to the respective engine limit, e.g., torque limit, NG limit or T5 limit, such that the remote engine operating limits are increased by the amount necessary to increase QTOTAL to be equal to QOEI.

The engine failure monitor of the present invention may be implemented in a variety of ways. As described herein before, associated with each engine is an electronic engine control. Whenever a digital electronic engine control is used which includes a microprocessor or the like, the invention may be implemented in software applied to the digital electronic engine control. Similarly, the invention may be implemented in a dedicated microprocessor separate from the electronic engine control. As will be understood by those skilled in the art, the invention may be practiced utilizing dedicated digital components to implement the routines of the present invention in accordance with the general equivalence between software as shown herein and dedicated digital hardware and software, which equivalence is described (in a different example) in U.S. Pat. No. 4,294,162.

It will be understood by those skilled in the art that the above described limits and thresholds are experimentally derived for particular engine types. The numbers employed herein are applicable to the Pratt & Whitney, Canada, PT6B-36 engines as used in the Sikorsky S-76B helicopter. All of the cycle times, counts, and the like herein may of course be adjusted to suit any implementation and utilization of the invention. Additionally, although the invention is described as being used on a two engine aircraft, the invention is equally applicable to any aircraft having at least 2 engines.

Although the invention has been shown and described with respect to exemplary embodiments thereof, it should be understood by those skilled in the art that the foregoing and other changes, omissions and additions may be made therein and thereto, without departing from the spirit and scope of the present invention.

We claim:

1. An engine failure monitor for detecting an engine failure in a multi-engine aircraft having at least two engines each of which includes a free turbine for driving an engine driveshaft and being operated in dependence on the angle of a power lever, each engine associated with a respective engine failure monitor constituting a local engine, and each remaining engine constituting a remote engine, comprising:
   means for providing a ground idle signal in response to said power lever being at an angle (PLA) above ground idle for said local engine;
   means for providing a local turbine shaft speed signal indicative of turbine shaft speed (NFLOC) of said local engine;
   means for providing a rotor speed signal indicative of main rotor speed (NR);
   means for providing a turbine shaft rate signal indicative of a rate of change in turbine shaft speed (NFDOT) of said local engine; and
   said engine failure monitor being responsive to a simultaneous occurrence, for a period in excess of a first threshold period, of said ground idle signal, said local turbine shaft speed signal exceeding said main rotor speed signal by a first threshold value, and said local turbine shaft rate signal being in excess of a second threshold value for providing a shaft failure signal indicative of local engine driveshaft failure.

2. The engine failure monitor according to claim 1 further comprising:
   means for providing a local engine torque signal indicative of an output torque of said local engine (QLOC);
   means for providing remote engine torque signals indicative of the output torque of said remote engine(s) (QRMT);
   means for providing a flight detent signal in response to said power lever being at an angle (PLA) between a first value and a second value; and
   said engine failure monitor being responsive to a simultaneous occurrence, for a period in excess of a second threshold period, of said flight detent signal, and one of said remote engine torque signals exceeding said local engine torque signal by a third threshold value for providing a partial engine failure signal indicative of partial failure of said local engine.

3. The engine failure monitor according to claim 2 further comprising:
   means for providing remote turbine shaft speed signals indicative of turbine shaft speed (NFREM) of said remote engines; and
   said engine failure monitor being responsive to a simultaneous occurrence, for a period in excess of a third threshold period, of said flight detent signal, said partial engine failure signal, and said local turbine shaft speed signal being less than one of said remote turbine shaft speed signals for providing an engine failure signal indicative of a total failure of said local engine after the occurrence of a partial failure of said local engine.

4. An engine failure monitor for detecting an engine failure in a multi-engine aircraft having at least two engines each of which includes a free turbine for driving an engine driveshaft and being operated in dependence on the angle of a power lever, each engine associated with a respective engine failure monitor constituting a local engine, and each remaining engine constituting a remote engine, comprising:
   means for providing a local engine torque signal indicative of an output torque of said local engine (QLOC);
   means for providing remote engine torque signals indicative of an output torque of said remote engine (QRMT);
   means for providing a flight detent signal in response to said power lever being at an angle (PLA) between a first value and a second value; and
   said engine failure monitor being responsive to a simultaneous occurrence, for a period in excess of a first threshold period, of said flight detent signal, and one of said remote engine torque signals exceeding said local engine torque signal by a first threshold value for providing a partial engine failure signal indicative of partial failure of said local engine.

5. The engine failure monitor according to claim 4 further comprising:
   means for providing a local turbine shaft speed signal indicative of turbine shaft speed (NFLOC) of said local engine;
   means for providing remote turbine shaft speed signals indicative of turbine shaft speed (NFREM) of said remote engines; and
   said engine failure monitor being responsive to a simultaneous occurrence, for a period in excess of a second threshold period, of said flight detent signal, said partial engine failure signal, and one of said remote turbine shaft speed signals exceeding said local turbine shaft speed signal for providing an engine failure signal indicative of a total failure of said local engine after the occurrence of a partial failure of said local engine.

6. An engine failure monitor according to claim 4 further comprising:
   means for providing a ground idle signal in response to said power lever being at an angle (PLA) above ground idle for said local engine;

means for providing a local turbine shaft speed signal indicative of turbine shaft speed (NFLOC) of said local engine;

means for providing a rotor speed signal indicative of main rotor speed (NR);

means for providing a turbine shaft rate signal indicative of a rate of change in turbine shaft speed (NFDOT) of said local engine; and said engine failure monitor being responsive to a simultaneous occurrence, for a period in excess of a third threshold period, of said ground idle signal, said local turbine shaft speed signal exceeding said main rotor speed signal by a second threshold value, and said local turbine shaft rate signal being in excess of a third threshold value for providing a shaft failure signal indicative of local engine driveshaft failure.

7. A method of detecting an engine failure in a multi-engine aircraft having at least two engines each of which includes a free turbine for driving an engine driveshaft and being operated in dependence on the angle of a power lever, each engine associated with a respective engine failure monitor constituting a local engine, and each remaining engine constituting a remote engine, the method comprising the steps of:

providing a ground idle signal in response to said power lever being at an angle (PLA) above ground idle for said local engine;

providing a local turbine shaft speed signal indicative of turbine shaft speed (NFLOC) of said local engine;

providing a rotor speed signal indicative of main rotor speed (NR);

providing a turbine shaft rate signal indicative of a rate of change in turbine shaft speed (NFDOT) of said local engine; and signaling a local engine driveshaft failure in response to a simultaneous occurrence, for a period in excess of a first threshold period, of said ground idle signal, said local turbine shaft speed signal exceeding said main rotor speed signal by a first threshold value, and said local turbine shaft rate signal being in excess of a second threshold value.

8. The method of claim 7 further comprising the steps of:

providing a local engine torque signal indicative of an output torque of said local engine (QLOC);

providing remote engine torque signals indicative of an output torque of said remote engine(s) (QRMT);

providing a flight detent signal in response to said power lever being at an angle (PLA) between a first value and a second value; and signaling a partial failure of said local engine in response to a simultaneous occurrence, for a period in excess of a second threshold period, of said flight detent signal, and one of said remote engine torque signals exceeding said local engine torque signal by a third threshold value.

9. The method of claim 8 further comprising the steps of:

providing remote turbine shaft speed signals indicative of turbine shaft speed (NFREM) of said remote engines; and signaling a total failure of said local engine after the occurrence of a partial failure of said local engine in response to a simultaneous occurrence, for a period in excess of a third threshold period, of said flight detent signal, said partial engine failure signal, and one of said remote turbine shaft speed signals exceeding said local turbine shaft speed signal.

10. A method of detecting an engine failure in a multi-engine aircraft having at least two engines each of which includes a free turbine for driving an engine driveshaft and being operated in dependence on the angle of a power lever, each engine associated with a respective engine failure monitor constituting a local engine, and each remaining engine constituting a remote engine, the method comprising the steps of:

providing a local engine torque signal indicative of an output torque of said local engine (QLOC);

providing remote engine torque signals indicative of an output torque of said remote engines (QRMT);

providing a flight detent signal in response to said power lever being at an angle (PLA) between a first value and a second value; and signaling a partial failure of said local engine in response to a simultaneous occurrence, for a period in excess of a first threshold period, of said flight detent signal, and one of said remote engine torque signals exceeding said local engine torque signal by a first threshold value.

11. The method of claim 10 further comprising the steps of:

providing a local turbine shaft speed signal indicative of turbine shaft speed (NFLOC) of said local engine;

providing remote turbine shaft speed signals indicative of turbine shaft speed (NFREM) of said remote engines; and signaling a total failure of said local engine after the occurrence of a partial failure of said local engine in response to a simultaneous occurrence, for a period in excess of a second threshold period, of said flight detent signal, said partial engine failure signal, and said local turbine shaft speed signal being less than one of said remote turbine shaft speed signals.

12. The method of claim 10 further comprising the steps of:

providing a ground idle signal in response to said power lever being at an angle (PLA) above ground idle for said local engine;

providing a local turbine shaft speed signal indicative of turbine shaft speed (NFLOC) of said local engine;

providing a rotor speed signal indicative of main rotor speed (NR);

providing a turbine shaft rate signal indicative of a rate of change in turbine shaft speed (NFDOT) of said local engine; and signaling a local engine driveshaft failure in response to a simultaneous occurrence, for a period in excess of a third threshold period, of said ground idle signal, said local turbine shaft speed signal exceeding said main rotor speed signal by a second threshold value, and said local turbine shaft rate signal being in excess of a third threshold value.

* * * * *